M. CLARK.
ANTISKIDDING DEVICE FOR ROAD VEHICLES.
APPLICATION FILED DEC. 4, 1911.

1,055,518.

Patented Mar. 11, 1913.

2 SHEETS—SHEET 1.

Witnesses:

Inventor:
Malville Clark.
By Burton Burton
Attys.

M. CLARK.
ANTISKIDDING DEVICE FOR ROAD VEHICLES.
APPLICATION FILED DEC. 4, 1911.

1,055,518.

Patented Mar. 11, 1913.

2 SHEETS—SHEET 2.

UNITED STATES PATENT OFFICE.

MELVILLE CLARK, OF CHICAGO, ILLINOIS.

ANTISKIDDING DEVICE FOR ROAD-VEHICLES.

1,055,518.   Specification of Letters Patent.   Patented Mar. 11, 1913.

Application filed December 4, 1911. Serial No. 663,703.

*To all whom it may concern:*

Be it known that I, MELVILLE CLARK, a citizen of the United States, residing at Chicago, in the county of Cook and State of Illinois, have invented new and useful Improvements in Antiskidding Devices for Road-Vehicles, of which the following is a specification, reference being had to the accompanying drawings, forming a part thereof.

The purpose of this invention is to provide means for preventing side sluing or skidding of road vehicles, particularly power-driven vehicles, such as automobiles and the like.

It consists in the elements and features of construction shown and described as indicated in the claims.

Figure 1:
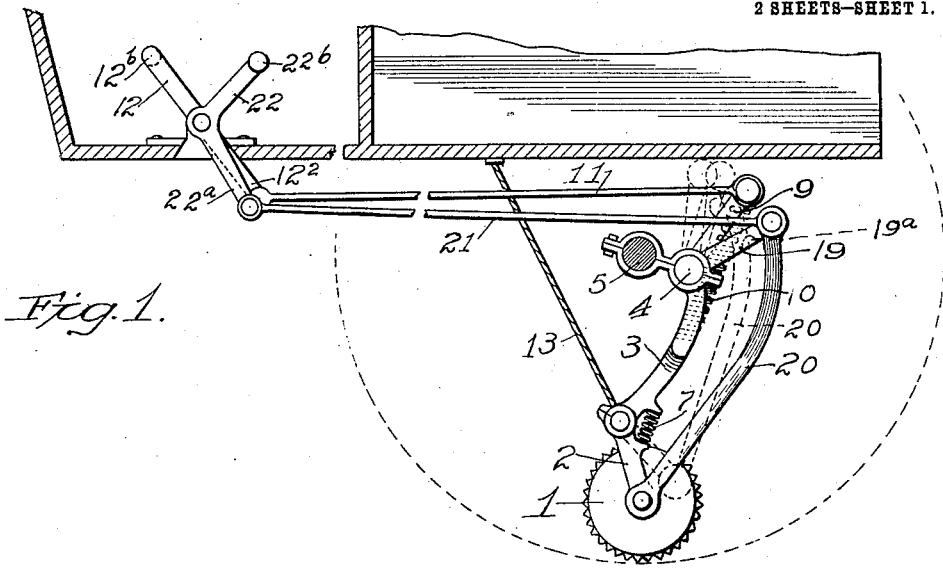
Figure 2:
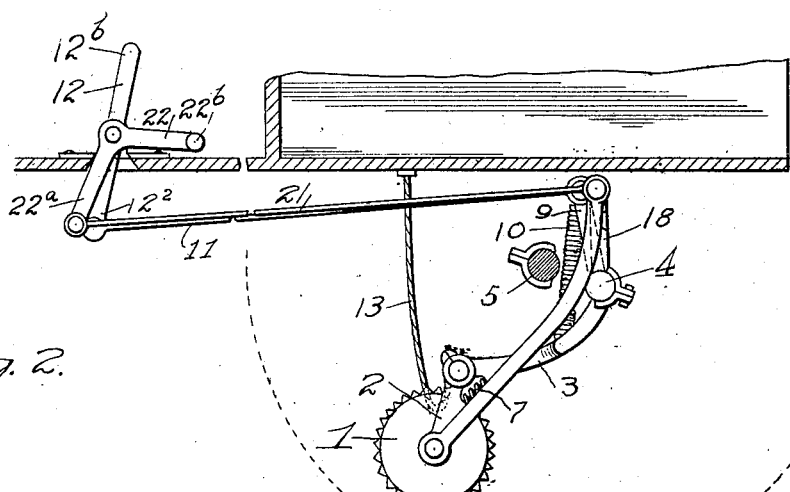
Figure 3:
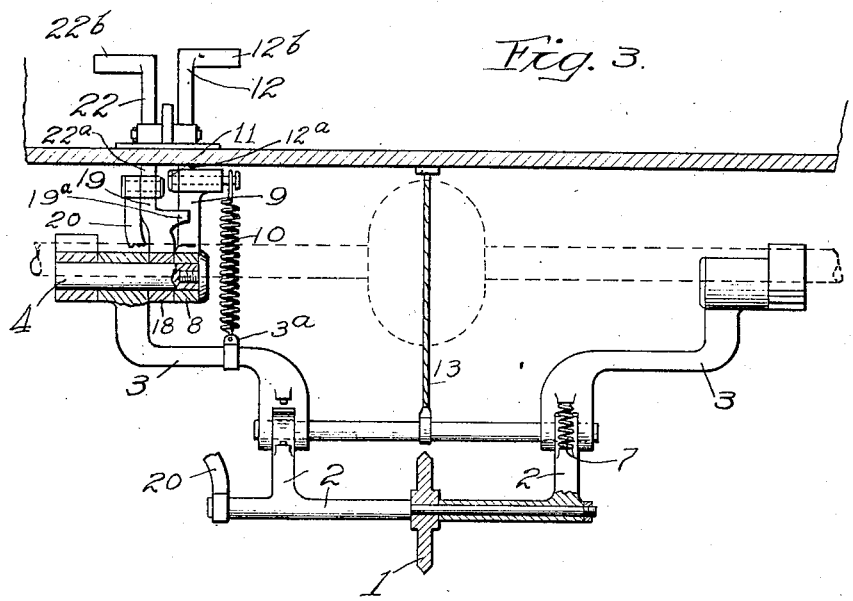
Figure 4:
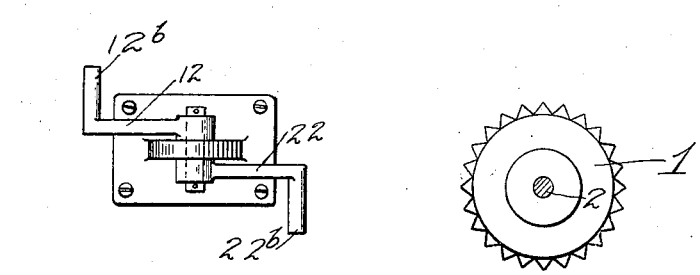
Figure 5:
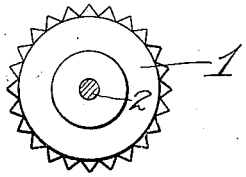

In the drawings:—Figure 1 is a fore-and-aft vertical section of a portion of the frame of an automobile equipped with a device embodying this invention and showing the device in position for contact with the road surface. Fig. 2 is a view taken similarly to Fig. 1, but showing the parts disengaged from the road surface. Fig. 3 is a rear elevation of the device with certain parts in section to show detail construction. Fig. 4 is a top plan view of the controlling pedals. Fig. 5 is an enlarged detail view of the road-engaging disk, 1.

The road-engaging device employed in this invention is a disk, 1, which is preferably beveled; that is, made wedge-shaped in radial section at the periphery, and which may be toothed, the result of the beveling and toothing being to form pyramidal teeth for encounter and engagement with the roadway. This disk is mounted on the end of a suitably formed arm 2, which constitutes the outer member of a jointed arm, which comprises in addition an upper member, 3, which extends as a lever arm from a rock shaft, 4, mounted on the vehicle frame or chassis, preferably at a position rearward of the axle, 5, of the rear or driving wheels, so that a line from the axis of the rock shaft to the point of engagement of the disk, 1, with the road-bed trends down forwardly at a small angle to a vertical line. The two members, 2 and 3, of the disk-carrying arm are jointed together and held normally at an angle to each other such that in view of the forward downward trend of the upper member, the lower member trends downward rearwardly from the joint of the two members to each other, and a powerful spring, 7, is provided operating between the two members, 2 and 3, at their joint to resist the rearward and upward folding of the lower member with respect to the upper. Upon the rock shaft, 4, or a fulcrum co-axial therewith, there is mounted a rocker, 8, comprising a lever arm, 9, which is connected by a spring, 10, with a lug, 3ª, which projects from the lever arm, 3, so as to terminate for connection with the spring opposite a point midway between the two extreme positions of the spring connection with the arm, 9, within the range of rocking of the rocker as hereinafter described.

The rocker arm, 9, is connected for actuation through a link, 11, to a pedal, 12, as indicated in Figs. 1 and 2. This pedal, 12, has the form of a straight lever pivoted between its ends and connected at its lower end, 12ª, with the link, 11, while the upper end carries a crank wrist, 12ᵇ, designed to serve as a treadle for the foot of the operator. The pedal, 12, will be employed only for bringing the disk, 1, into engagement with the road surface; that is, for moving it from the position shown in Fig. 2 to that shown in Fig. 1. When the parts stand as indicated in Fig. 2, the forward movement of the treadle, 12ᵇ, will cause the arm, 9, to swing rearwardly about its rock shaft, 4, carrying the spring, 10, through and to the rear of the axis of the rock shaft, 4, and thus causing it to draw the member, 3, rearwardly about the shaft, 4, so as to lower the disk, 1, into road-engaging position.

By reason of the downwardly forward trend of the jointed lever arm, 2, 3, considered as a whole, it will be seen that when the treadle is rocked so as to swing the upward member and thereby the entire device downward, bringing the disk, 1, in contact with the road-bed, the forward travel of the vehicle will draw the disk down into engagement with the road-bed, as far as the condition of the road-bed and the resistance afforded by the spring, 7, will permit, to a certain extent, which is preferably determined by a check strap, 13, provided on the vehicle frame or chassis, stopping the rearward swing of the arm, 3.

It may be noted that the forward travel of the vehicle while the disk is engaged with the road-bed, tending to draw the disk into engagement with the road-bed, would produce thereby, especially in the case of rapid travel, a strong resistance to disengaging the disk, 1, from the road if this were attempted by swinging the arm, 2, 3, forward. To avoid this difficulty, there is mounted on the rock shaft, 4, a second rocker, 18, which has a lever arm, 19, connected by a link, 20, with the lower member, 2, of the jointed lever, said lever arm and link being relatively proportioned and positioned so that the rocking movement of the rocker, 18, in the direction of the like movement of the rocker, 8, which shifts the spring, 10, to position for pulling up on the lever arm, 3, will fold the lever arm, 2, up rearwardly about its joint with the lever arm, 3, thus disengaging the disk from the road-bed by movement in the direction in which such disengagement will be assisted, instead of resisted, by the travel of the vehicle. The rocker arm, 19, is connected through a link, 21, with a second pedal, 22, mounted co-axially with the pedal, 12, and having the form of the bell crank with its lower arm, 22$^a$, coupled to the link, 21, while its upper arm terminates in a pedal, 22$^b$, similar to the pedal, 12$^b$. The rocker arm, 19, has a laterally projecting plug, 19$^a$, which extends for contact with the rear side of the arm, 9. Thus, when the pedal, 22$^b$, is depressed, causing the arm, 22$^a$, to be thrown forward, this movement results in a forward rocking of the arm, 19, drawing up the lower member, 2, and sufficiently disengaging the disk, 1, from the road to permit the arm, 3, to be swung upward and forward as the lug, 19$^a$, picks up and carries forward the arm, 9, by which the spring, 10, is carried forward of the axis of the rock shaft, 4, back to the position of the parts illustrated in Fig. 2. By this means, the operator is relieved from any necessity for attention to the details of the action, having only to press the proper pedal arm of the treadle in order to first disengage the disk from the road-bed, and next or simultaneously, rock the spring connection to position for causing it to lift the disk away from the road-bed.

It will be observed that the jointed and foldable construction of the lever arm, 2, 3, and the trend of the lower member, 2, from the joint permits the disk to readily ride over obstructions in the roadway which would otherwise break it or compel the vehicle to be lifted over them by the disk rising over them; and at the same time, it would be observed that the stiffness of the spring, 7, insures adequate engagement of the disk with the road-bed to resist the lateral slewing of the vehicle.

I claim:—

1. An anti-skidding device for road vehicles comprising, in combination with a vehicle frame and wheels, a jointed arm having one member pivotally connected at its upper end with the vehicle frame and a second member having its upper end pivotally connected to the lower end of the first, a disk journaled in the lower end of the second member for engagement with the road-bed, the parts being so disposed and proportioned that in the roadway-engaging position of the disk the first member trends downwardly and forwardly from its connection to the vehicle frame, and the second member trends downwardly and rearwardly from its joint to the first member, the point of ground contact of the disk being forward of the pivotal connection of the first member to the frame, and a spring reacting between the two members tending to resist the upward and rearward folding of the second member with respect to the first.

2. An anti-skidding device comprising, in combination with a vehicle frame and wheels, a jointed lever arm comprising a first member pivoted on the frame for swinging in a vertical plane, and the second member pivoted to the first member; a disk for engagement of the road-way, journaled in the end of the second member, the parts being proportioned to cause the said second member to trend downwardly and rearwardly from its pivot to the first member at the road-way engaging position of the disk; a spring positioned to resist the upward folding of said second member; a rocker whose axis is coincident with the pivot axis of said first member; a spring connected eccentrically with said rocker and with said first lever arm; an operating device and a link connecting the same with the rocker for rocking it to swing the spring past the axis of the rocker, whereby at one position the spring operates to lift the lever arm and at another position operates to lower it.

3. An anti-skidding device for road vehicles, comprising a vehicle frame and wheels, a jointed lever arm fulcrumed upon the vehicle frame; a disk carried by the remote end of such lever arm for engagement of the road-way intermediate the tracks of the opposite wheels, said arm comprising an upper and a lower member, the lower member trending downwardly and rearwardly from its joint to the upper member, the parts being proportioned to cause the road contact of the disk to be forward of the vertical plane of the fulcrum of the jointed arm on the vehicle frame; a spring acting between the two members of the jointed arm to resist the folding upward of the lower member; a rocker fulcrumed on the frame co-axially with the jointed lever arm; a spring connected to said rocker at a point above the axis of the rocker and to the upper member of the jointed lever arm at a point below said axis, a second rocker fulcrumed co-axially with the first, a link from said second rocker to the lower member of the jointed arm, means for rocking the second rocker at will in direction for lifting the lower member, said second rocker being provided with means for engaging the first to rock it in direction to carry the upper end of the spring from one side to the other of said fulcrum axis.

In testimony whereof, I have hereunto set my hand at Chicago, Illinois, this 16th day of November, 1911.

MELVILLE CLARK.

Witnesses:
CHAS. S. BURTON,
M. GERTRUDE ADY.